Patented Jan. 5, 1937

2,066,366

UNITED STATES PATENT OFFICE 2,066,366

PROCESS FOR MAKING SILICA STONE MATERIAL

Hermann Salmang and Benno Wentz, Aachen, Germany

No Drawing. Application July 7, 1932, Serial No. 621,316. In Germany July 21, 1931

3 Claims. (Cl. 106—9)

This invention relates to a method of treating a crude silica mass to convert the same into tridymite or, if desired, into silica bricks in which the quartz is not entirely converted into tridymite.

Whereas generally temperatures higher than 1400° C. have been required to convert a raw silica mass into tridymite, one of the objects of the present invention is to provide a method by which this conversion may be effected at temperatures lower than 1400° C.

A further object of this invention is to provide a method of forming silica bricks which method may be effectively controlled to control the specific gravity of the bricks produced.

Other objects and advantages of this invention will become more apparent as the following description proceeds.

In Canadian Patent No. 320,467 (corresponding U. S. application No. 497,060 of November 20th, 1930) a process for making tridymite stone material is disclosed which is characterized by the feature that during the burning operation a melt or flux is produced within the stone material which consists of at least four oxides. These oxides are: silicic acid and lime, which are present in all silica stone material, and in addition an alkali oxide and a fourth oxide e. g. a heavy metal oxide such as iron oxide or magnesia.

As brought out in our co-pending application Serial Number 497,060, natron may be used as the alkali while the heavy metal oxide may be iron oxide, zinc oxide, nickel oxide, manganese oxide or the like, or in their place magnesia may be used. Thus as an example, a raw silica mass, of which 50% is finely ground, may be mixed with sulphite lye, 2% chalk, 1.5% natron and 1.5% iron oxide, this mixture then being burned at the desired temperature.

It has now been found that this process can be used not only for making tridymite stone material but also for making silica stone material which is not wholly converted into tridymite. As compared with the process heretofore usual in the art for making silica stone material the advantage can here be utilized that the transformation of the quartz, which in the processes hitherto used had to be carried out at temperatures exceeding 1400° C., can be effected at much lower temperatures. The transforming power of the flux described above is so great that the temperature of the burning may be lowered several hundred degrees according to the degree of the transformation desired. Thus, for making ordinary silica stone material having a specific gravity of 2.40, it is sufficient to maintain an interior burning temperature of about 1150° C. By raising the temperature of the burning and "dosing", i. e. adjusting the quantity of the flux any desired degree of transformation and any desired density of the stone material may be attained. For fully transformed stone material a burning temperature of 1375° is sufficient. However, the production of ordinary silica stone material may also be accelerated by addition of very little flux, e. g. 0.1 to 0.3% of alkali oxide, at high temperatures.

The transformation of the quartz of the crude material by the flux may be made more effective still by adding it in a form which is not water soluble. If the alkali is added in the form of ordinary salts then it will be drawn to the surface during the drying of the shaped stone material with the water present in the latter, in which water it dissolves, and will accummulate at the surface or even form an efflorescence. As a result the interior of the stone may become deficient in alkali, with consequent detriment to the transformation. This drawback can be removed by adding the flux, e. g. iron oxide and alkali oxide, in an insoluble form. In the case of iron oxide this offers no difficulty; alkali oxide is preferably added in the form of an insoluble salt, e. g. sodium silico-fluoride or a frit of soda, ferrous oxide and silicic acid. The frit effects the transformation very satisfactorily, but sodium silico-fluoride is not so good, even if iron oxide or another oxide is added as well. The use of a water-insoluble mixture of the oxides used as transforming agents or of their compounds ensures uniform transformation and uniform quality of the stone material.

What we claim is:

1. The method of making silica stone material which consists in burning a mixture of raw silica material, lime and a frit containing an alkali oxide and a metallic oxide.

2. The method of making silica stone material which consists in burning a mixture of raw silica material, lime and a frit consisting of soda, ferrous oxide and silicic acid.

3. The method of making a silica stone material which consists in burning at a temperature of between 1100°–1400° C. a mixture of raw silica material, lime, iron oxide, and an insoluble alkali salt.

HERMANN SALMANG.
BENNO WENTZ.